United States Patent
Kim

(10) Patent No.: US 11,681,014 B2
(45) Date of Patent: Jun. 20, 2023

(54) VEHICULAR RADAR SENSOR

(71) Applicant: HYUNDAI MOBIS CO., LTD., Seoul (KR)

(72) Inventor: Young Min Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 213 days.

(21) Appl. No.: 17/154,499

(22) Filed: Jan. 21, 2021

(65) Prior Publication Data

US 2021/0255276 A1   Aug. 19, 2021

(30) Foreign Application Priority Data

Feb. 18, 2020   (KR) .................. 10-2020-0019768

(51) Int. Cl.
| | | |
|---|---|---|
| G01S 7/03 | (2006.01) | |
| G01S 13/931 | (2020.01) | |
| H01Q 1/32 | (2006.01) | |
| H01Q 1/52 | (2006.01) | |
| H01Q 13/02 | (2006.01) | |
| H01Q 1/42 | (2006.01) | |

(52) U.S. Cl.
CPC ............ *G01S 7/032* (2013.01); *G01S 13/931* (2013.01); *H01Q 1/3233* (2013.01); *H01Q 1/52* (2013.01); *H01Q 13/02* (2013.01); *H01Q 1/42* (2013.01)

(58) Field of Classification Search
CPC ..... G01S 7/032; G01S 13/931; H01Q 1/3233; H01Q 1/52; H01Q 13/02; H01Q 1/42
See application file for complete search history.

(56) References Cited

U.S. PATENT DOCUMENTS

| | | | | |
|---|---|---|---|---|
| 4,200,870 A | * | 4/1980 | Gabbitas | G01S 7/032 342/175 |
| 10,741,924 B1 | * | 8/2020 | McGrath | H01Q 5/30 |
| 2005/0078044 A1 | * | 4/2005 | Rodriguez | H01Q 13/0275 343/786 |
| 2005/0231436 A1 | * | 10/2005 | McLean | H01Q 13/0275 343/786 |
| 2005/0285773 A1 | * | 12/2005 | Hartzstein | H01Q 1/3233 342/107 |
| 2009/0079649 A1 | * | 3/2009 | Steghafner | H01Q 13/0275 343/786 |
| 2009/0251357 A1 | * | 10/2009 | Margomenos | G01S 13/931 342/70 |
| 2009/0267852 A1 | * | 10/2009 | Tahmisian, Jr. | H01Q 25/02 343/786 |

(Continued)

FOREIGN PATENT DOCUMENTS

KR    10-2017-0063277    6/2017

*Primary Examiner* — Peter M Bythrow
(74) *Attorney, Agent, or Firm* — H.C. Park & Associates, PLC

(57) ABSTRACT

A vehicular radar sensor includes an emission part for emitting an electromagnetic wave and a reception part for receiving an electromagnetic wave, and a waveguide including a restriction portion, which is open at front and rear surfaces thereof so as to allow an electromagnetic wave to be transmitted therethrough and which is fixed at the open rear surface thereof to the antenna and extends outwards from a front end of the antenna, and a flaring portion, which extends outwards with an increasing cross-sectional area from a front end of the restriction portion.

17 Claims, 8 Drawing Sheets

(56) References Cited

U.S. PATENT DOCUMENTS

| | | | | |
|---|---|---|---|---|
| 2010/0033391 | A1* | 2/2010 | McLean | H01Q 13/085 |
| | | | | 343/786 |
| 2013/0099972 | A1* | 4/2013 | Yun | H01Q 13/0275 |
| | | | | 342/368 |
| 2015/0002354 | A1* | 1/2015 | Knowles | H01Q 13/0283 |
| | | | | 343/908 |
| 2016/0091597 | A1* | 3/2016 | Abe | H01Q 13/02 |
| | | | | 342/175 |
| 2016/0093944 | A1* | 3/2016 | Kamo | H01Q 1/1271 |
| | | | | 348/148 |
| 2017/0062931 | A1* | 3/2017 | Abe | H01Q 5/55 |
| 2017/0069972 | A1* | 3/2017 | Miller | H01Q 13/06 |
| 2018/0267161 | A1* | 9/2018 | Nagaishi | G01S 7/03 |
| 2019/0310345 | A1* | 10/2019 | Nagaishi | H01Q 21/06 |
| 2020/0059000 | A1* | 2/2020 | Kamo | H01Q 13/0275 |
| 2020/0101889 | A1* | 4/2020 | Iwai | H01Q 1/3291 |
| 2020/0136267 | A1* | 4/2020 | Choon | H01Q 1/22 |
| 2020/0212594 | A1* | 7/2020 | Kirino | H01Q 21/064 |
| 2020/0319293 | A1* | 10/2020 | Kuriyama | G01S 13/93 |
| 2021/0218151 | A1* | 7/2021 | Menargues Gomez | |
| | | | | H01Q 21/005 |

* cited by examiner

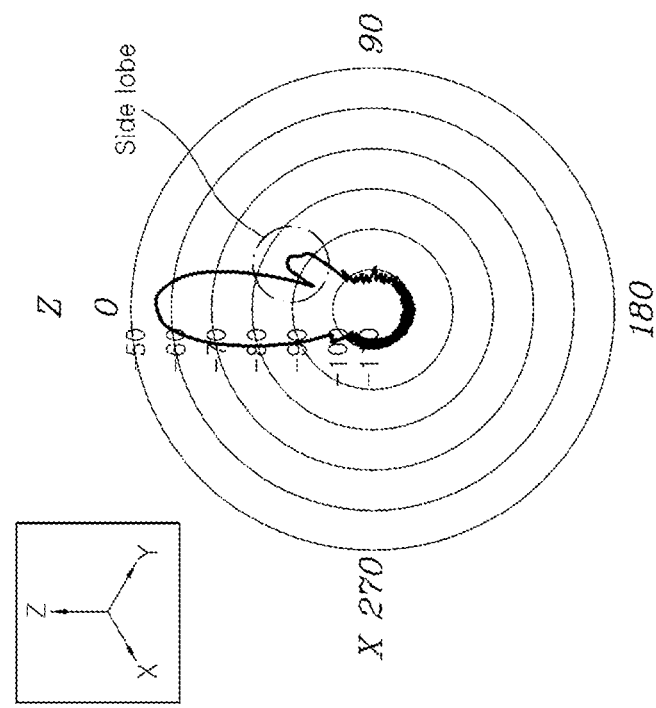
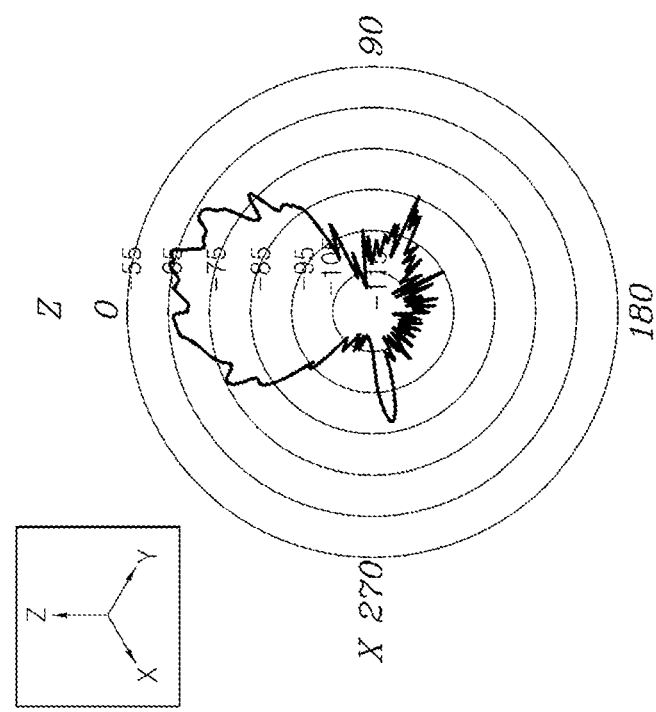
FIG. 8

VEHICULAR RADAR SENSOR

CROSS-REFERENCE TO RELATED APPLICATION

This application claims the priority from and the benefit of Korean Patent Application No. 10-2020-0019768, filed on Feb. 18, 2020, which is hereby incorporated by reference for all purposes as if set forth herein.

BACKGROUND

Field

Embodiments described herein relate to a vehicular radar sensor, and more particularly to a vehicular radar sensor, which is provided with a waveguide for guiding electromagnetic waves emitted from and received by an antenna of the radar.

Discussion of the Background

Vehicles, which are recently developed and commercially available, are provided with various advanced safety devices. Particularly, vehicles are provided with internal and external radar sensors, lidar sensors, ultrasonic sensors and the like.

The term "radar" is an abbreviation of radio detection and ranging, and a radar sensor is a wireless monitoring device adapted to emit an electromagnetic wave having a frequency on the other of microwaves to an object to be detected and to receive the electromagnetic wave reflected by the object, thereby monitoring the distance to the object, the direction of the object, the altitude of the object and the like.

Particularly, a radar sensor for a vehicle is an ultracompact radar sensor. Because the radar sensor for a vehicle is fixed to the interior of a bumper of the vehicle, interference occurs due to irregular reflection of the electromagnetic wave signal by the bumper. Hence, there is a problem in that an obstacle is falsely detected due to irregular reflection of a back lobe even when no obstacle is present in front of the sensor, or, when an obstacle is present in front of the sensor, the obstacle cannot be detected.

Furthermore, in order to manufacture a radar sensor integrated with an antenna adapted to emit and receive electromagnetic waves, there is a need to design a guide capable of guiding electromagnetic waves.

Details described as the background art are intended merely for the purpose of promoting an understanding of the background of the present invention and should not be construed as an acknowledgment of the prior art that is previously known to those of ordinary skill in the art.

The above information disclosed in this Background section is only for enhancement of understanding of the background of the invention and, therefore, it may contain information that does not constitute prior art.

SUMMARY

Therefore, the present invention has been made in view of the above problems, and one or more embodiments are directed to a vehicular radar sensor, which is provided with a waveguide for electromagnetic waves emitted from and received by an antenna so as to be capable of emitting and receiving electromagnetic waves through a single antenna and of more precisely monitoring an object than a conventional radar sensor.

In accordance with one embodiment, a vehicular radar sensor includes an antenna including an emission part for emitting an electromagnetic wave and a reception part for receiving an electromagnetic wave, and a waveguide including a restriction portion, which is open at front and rear surfaces thereof so as to allow an electromagnetic wave to be transmitted therethrough and which is fixed at the open rear surface thereof to the antenna and extends outwards from a front end of the antenna, and a flaring portion, which extends outwards with an increasing cross-sectional area from a front end of the restriction portion.

The vehicular radar sensor may further include a shield case, which is open at a front surface thereof and covers a circuit board and the waveguide mounted therein.

The vehicular radar sensor may further include a housing, which includes a connector pin electrically connected to the antenna and accommodates therein the shield case having the antenna and the waveguide mounted therein.

The housing may be open at a front surface thereof, and the vehicular radar sensor may further include a radome, which covers the front open surface of the housing and prevents interference with an electromagnetic wave emitted from or received by the antenna.

The waveguide may have a rectangular cross-section, and the flaring portion may be inclined upwards or downwards at a first predetermined angle, and may be inclined rightwards or leftwards at a second predetermined angle, the first predetermined angle being greater than the second predetermined angle.

The restriction portion may have a depth that is equal to one wavelength of the electromagnetic wave emitted from the antenna.

The flaring portion may have a depth that is two times one wavelength of the electromagnetic wave emitted from the antenna.

The antenna may include a circuit board, on which a circuit is formed, and a semiconductor mounted on the circuit board so as to project in a forward direction of the circuit board, the semiconductor being adapted to emit and receive the electromagnetic wave.

The waveguide may have a groove formed in a rear end thereof, the groove being formed through one wall of the restriction portion and having a depth greater than a thickness of the semiconductor.

The groove may be formed in a lower wall of the waveguide so as to create a side lobe, which is positioned under a main lobe of the electromagnetic wave emitted from and received by the antenna.

The waveguide may include a connector, which extends rearwards from the restriction portion and which is fitted into the circuit board so as to integrally couple the waveguide to the antenna.

The waveguide may include a partition wall, which partitions an internal space of the waveguide into two spaces.

The partition wall may extend vertically from an inner surface of the waveguide to divide the antenna into an emission part and a reception part.

The antenna may include a circuit board, on which a circuit is formed, and a semiconductor mounted on the circuit board so as to project in a forward direction of the circuit board, the semiconductor being adapted to emit and receive the electromagnetic wave, the waveguide may have a groove formed in a rear end thereof, the groove being formed through one wall of the restriction portion and having a depth greater than a thickness of the semiconductor, and the partition wall may be formed on an inner surface of the waveguide in front of the semiconductor or the groove.

In accordance with another embodiment, a vehicular radar sensor includes an antenna including an emission part for emitting an electromagnetic wave and a reception part for receiving an electromagnetic wave; and a waveguide including a first portion which allows an electromagnetic wave to be transmitted therethrough and which is fixed at one surface thereof to the antenna and extends outwards from a front end of the antenna, and a second portion which extends outwards with an increasing cross-sectional area from the first portion.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 8 is a view illustrating targets detected by vehicular radar sensors in a vertical field of view, in which the figure on the right illustrates a target detected by the vehicular radar sensor according to the embodiment and the figure on the left illustrates a target detected by a conventional vehicular radar sensor.

DETAILED DESCRIPTION OF THE ILLUSTRATED EMBODIMENTS

Figure 1:
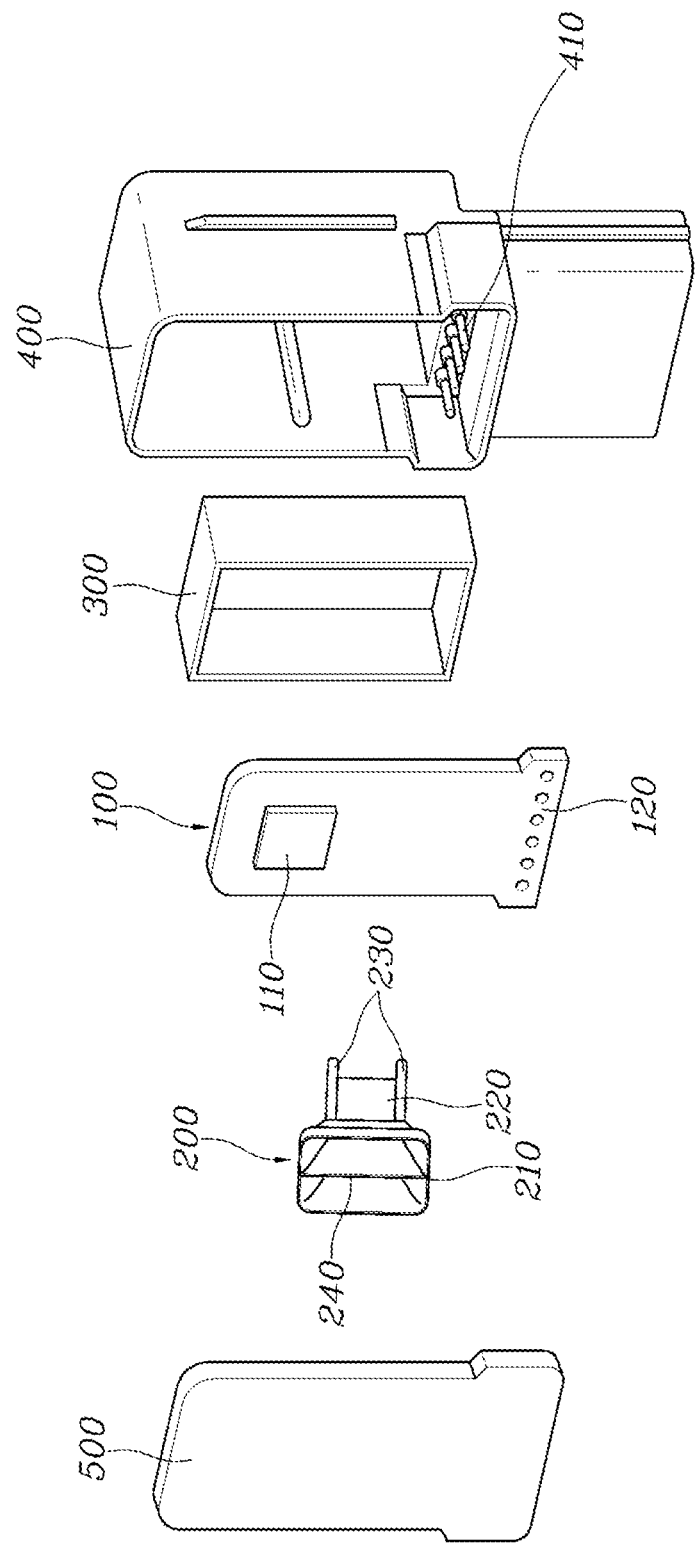
FIG. 1 is an exploded perspective view of the vehicular radar sensor according to an embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Specific structural and functional descriptions of embodiments of the present invention disclosed herein are only given for the purposes of illustrating the embodiments of the present invention. The present invention may be embodied in many different forms without departing from the spirit and significant characteristics of the present invention. Therefore, the embodiments of the present invention are disclosed only for illustrative purposes and should not be construed as limiting the present invention.

Reference will now be made in detail to various embodiments of the present invention, specific examples of which are illustrated in the accompanying drawings and described below, since the embodiments of the present invention can be variously modified in many different forms. While the present invention will be described in conjunction with embodiments thereof, it is to be understood that the present description is not intended to limit the present invention to those embodiments. On the contrary, the present invention is intended to cover not only the embodiments described herein, but also various alternatives, modifications, equivalents and other embodiments that may be included within the spirit and scope of the present invention as defined by the appended claims.

It will be understood that, although the terms "first," "second," etc. may be used herein to describe various elements, these elements should not be construed as being limited by these terms. These terms are only used to distinguish one element from another element. For instance, a first element discussed below could be termed a second element without departing from the teachings of the present invention. Similarly, the second element could also be termed the first element.

It should be understood that when an element is referred to as being "coupled" or "connected" to another element, it can be directly coupled or connected to the other element, or intervening elements may be present therebetween. Conversely, it should also be understood that when an element is referred to as being "directly coupled" or "directly connected" to another element, there are no intervening elements present. Other expressions that explain the relationships between elements, such as "between," "directly between," "adjacent to," or "directly adjacent to," should be understood in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms including technical and scientific terms used herein have the same meanings as those commonly understood by one of ordinary skill in the art to which this invention belongs. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Hereinafter, embodiments will be described in detail with reference to the accompanying drawings.

Figure 2:
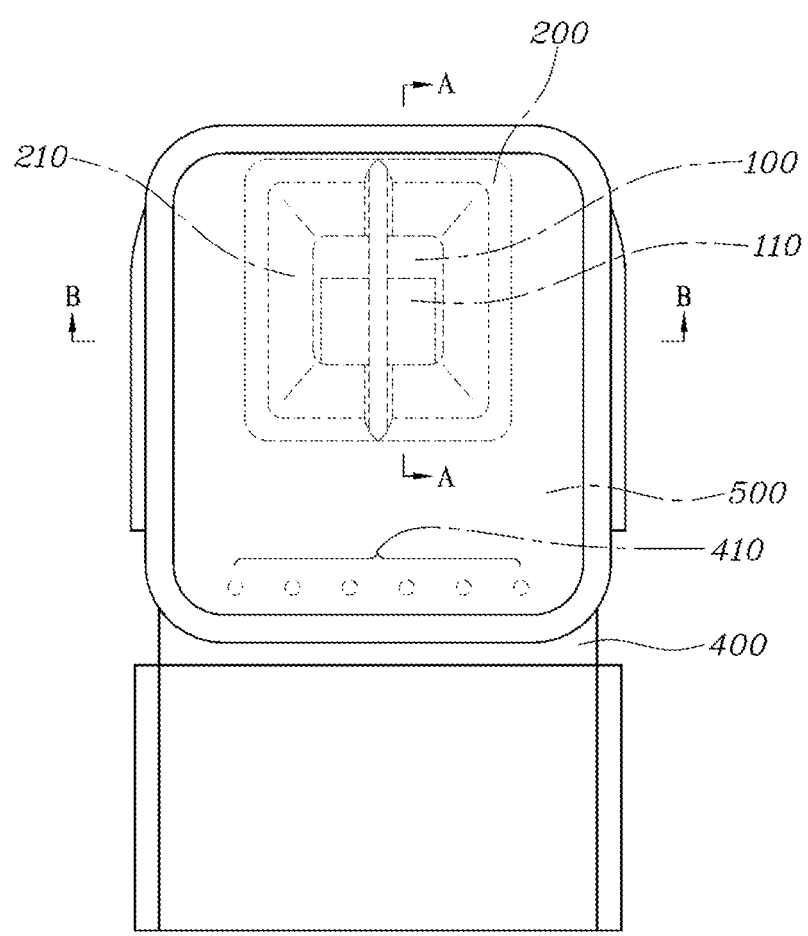
FIG. 2 is a front view of the vehicular radar sensor according to the embodiment.
Figure 3:
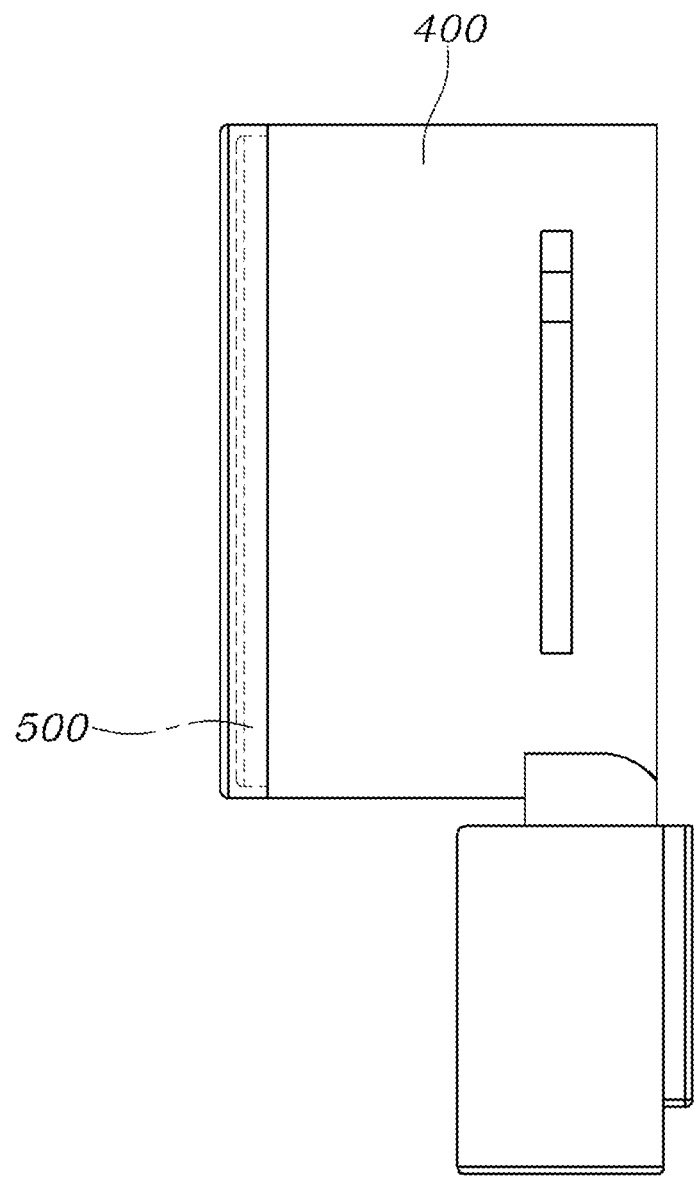
FIG. 3 is a side view of the vehicular radar sensor according to the embodiment.
Figure 4:
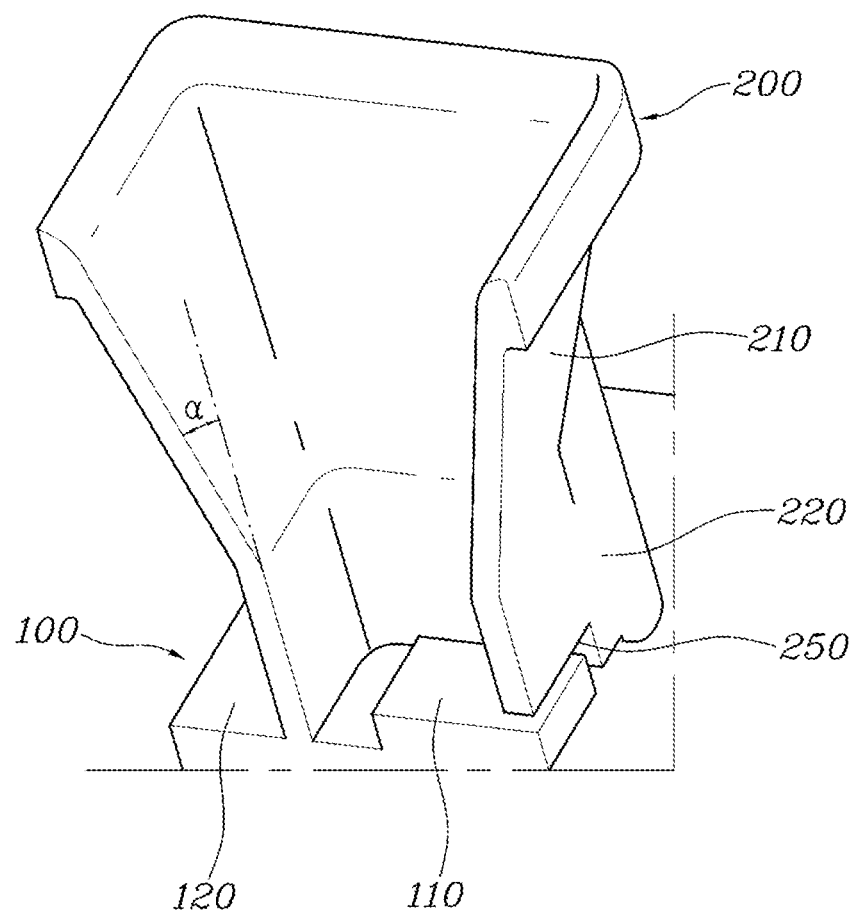
FIG. 4 is a cross-sectional view taken along line A-A in FIG. 2.
Figure 5:
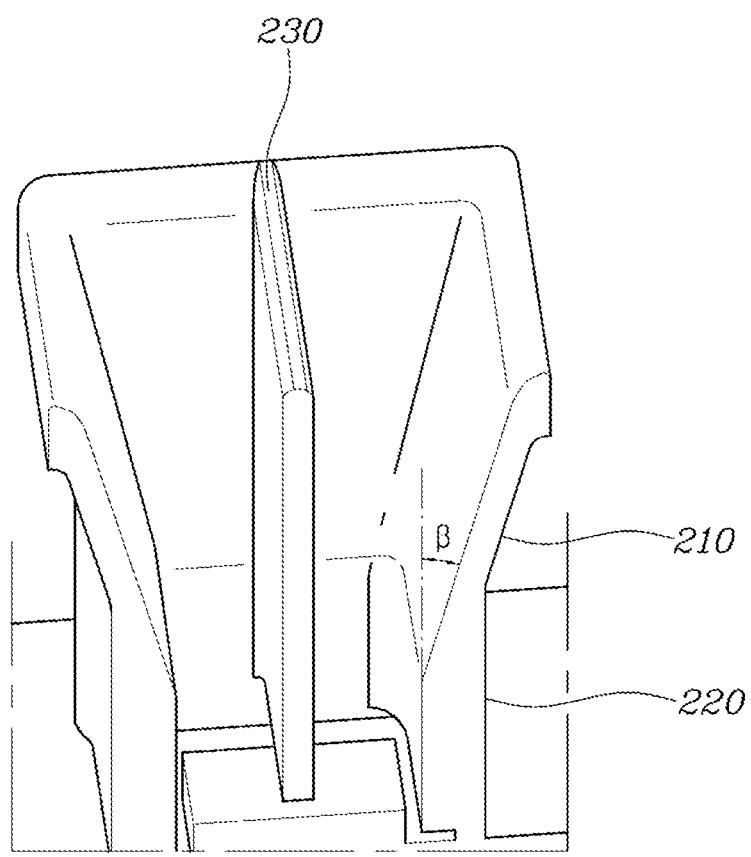
FIG. 5 is a cross-sectional view taken along line B-B in FIG. 2.
Figure 6:
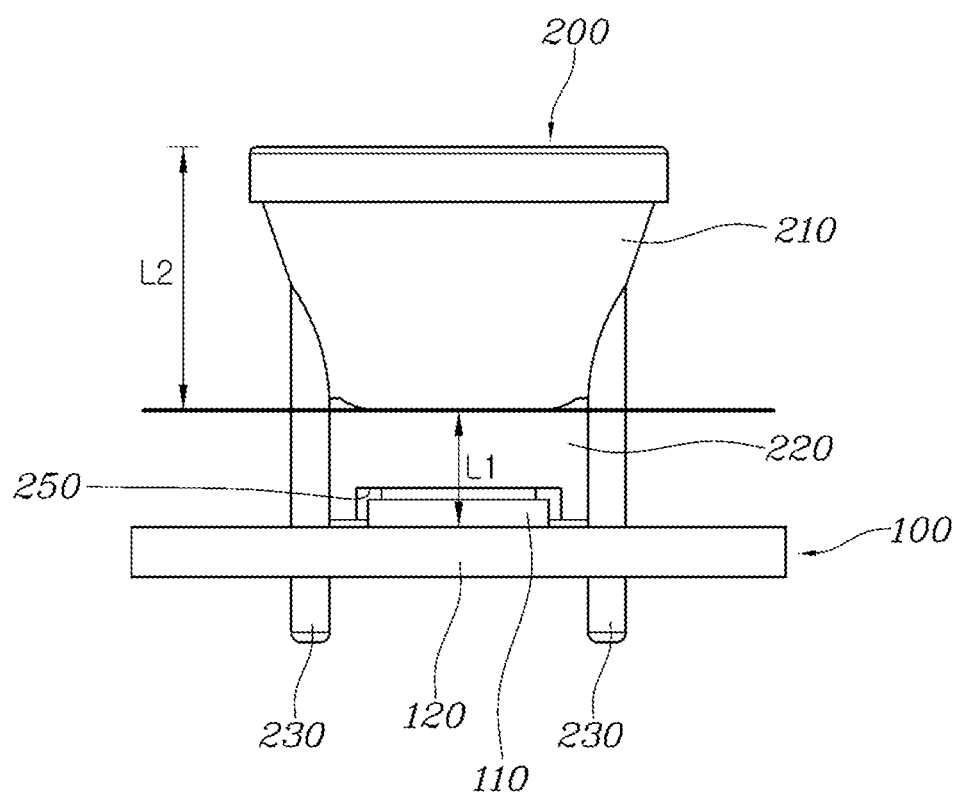
FIG. 6 is a view illustrating the lower wall of the waveguide, among the components of the vehicular radar sensor according to the embodiment.
Figure 7:
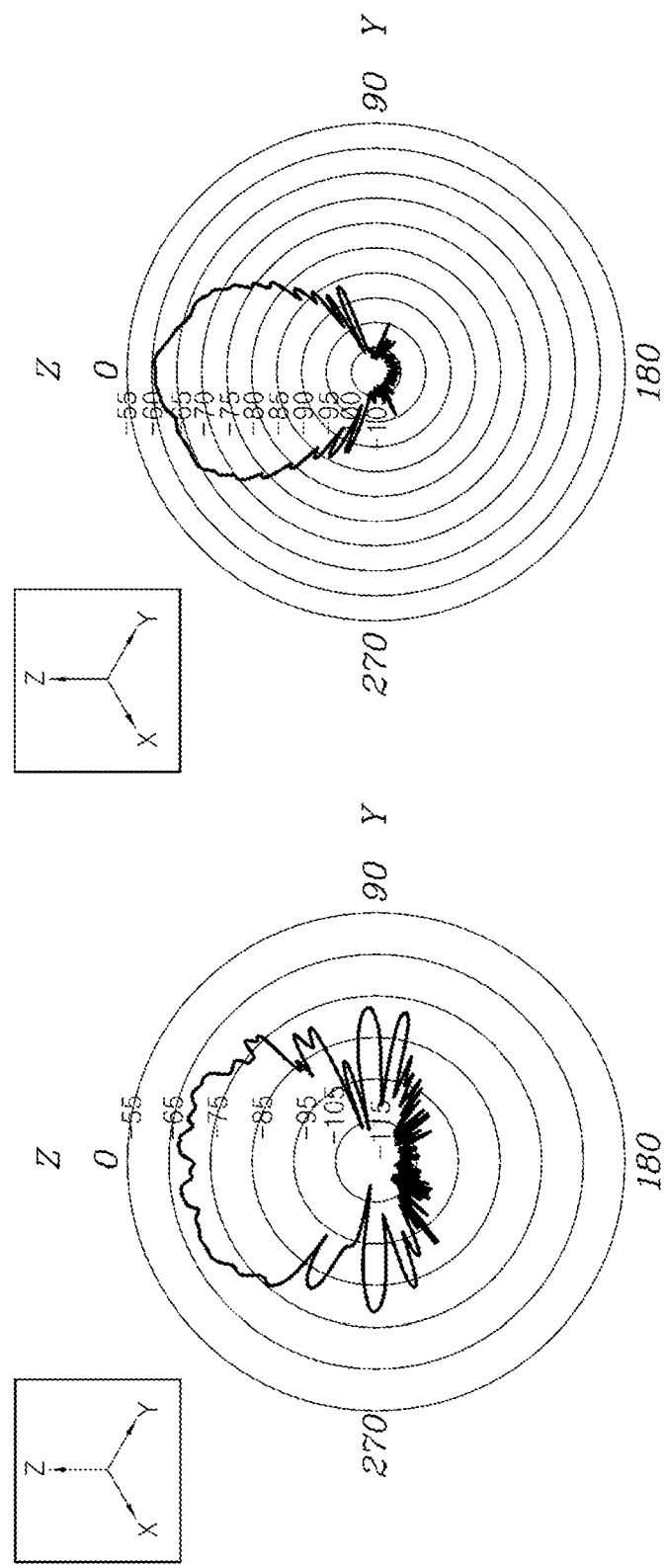
FIG. 7 is a view illustrating targets detected by vehicular radar sensors in a horizontal field of view, in which the figure on the right illustrates a target detected by the vehicular radar sensor according to the embodiment and the figure on the left illustrates a target detected by a conventional vehicular radar sensor.

FIG. 1 is an exploded perspective view of the vehicular radar sensor according to an embodiment of the present invention. FIG. 2 is a front view of the vehicular radar sensor according to the embodiment of the present invention. FIG. 3 is a side view of the vehicular radar sensor according to the embodiment of the present invention. FIG. 4 is a cross-sectional view taken along line A-A in FIG. 2. FIG. 5 is a cross-sectional view taken along line B-B in FIG. 2. FIG. 6 is a view illustrating the lower wall of the waveguide, among the components of the vehicular radar sensor according to the embodiment of the present invention. FIG. 7 is a view illustrating targets detected by vehicular radar sensors in a horizontal field of view, in which the figure on the right illustrates a target detected by the vehicular radar sensor according to the embodiment of the present invention and the figure on the left illustrates a target detected by a conventional vehicular radar sensor. FIG. 8 is a view illustrating targets detected by vehicular radar sensors in a vertical field of view, in which the figure on the right illustrates a target detected by the vehicular radar sensor according to the embodiment of the present invention and the figure on the left illustrates a target detected by a conventional vehicular radar sensor.

Referring to FIGS. 1 to 8, the vehicular radar sensor according to an embodiment of the present invention may include an antenna 100 which is provided with a emission unit adapted to emit electromagnetic waves and a reception unit adapted to receive electromagnetic waves; and a waveguide 200 which includes a restriction portion, which is open at the front and rear surfaces thereof so as to guide electromagnetic waves transmitted therethrough and which is fixed at the open rear surface thereof to the antenna 100 and extends forwards from the antenna 100, and a flaring portion 210, which extends obliquely outwards from the front end of the restriction portion so as to increase in cross-sectional area.

The antenna 100 may emit a radar signal toward a target to be detected, and may receive the radar signal reflected by the target. In other words, the antenna 100 may be a directional antenna.

Specifically, the antenna 100 may most intensively emit and receive a radar signal in a main lobe direction, and may less intensively emit and receive a radar signal in a side lobe direction or in a back lobe direction that is opposite the main lobe direction. Here, the side lobe direction may refer to a direction other than the main lobe direction, among horizontal patterns of the antenna 100.

The antenna 100 may have a relatively large angular field of view (AFOV) of 140-150 degrees in a horizontal direction, and may have a relatively small angular field of view of 50-60 degrees in a vertical direction.

The antenna 100 may be constructed such that a semiconductor 110 is mounted on a circuit board 120 so as to emit or receive electromagnetic waves to thus monitor a target.

The waveguide 200, which is coupled to the antenna 100, may be composed of the restriction portion, which has a constant cross-sectional area in a forward direction of the antenna 100 in consideration of a drive frequency of an electromagnetic wave generated by the antenna 100, and the flaring portion 210, which extends obliquely in a forward and outward direction of the restriction portion such that the cross-sectional area thereof increases moving forwards. Accordingly, the waveguide 200 is capable of more precisely detecting a target by controlling horizontal and vertical beam patterns of the electromagnetic wave.

Referring to FIGS. 7 and 8, it will be appreciated that, comparing a target detected by a conventional vehicular radar sensor shown on the left side in each of the drawings with the target detected by the vehicular radar sensor according to the present invention shown on the right side in each of the drawings, the vehicular radar sensor according to the present invention is capable of more precisely detecting the target than a conventional vehicular radar sensor.

The vehicular radar sensor according to the present invention may further include a shield case 300, which is open at the front surface and covers the circuit board 120 and the waveguide 200 mounted therein.

The shield case 300 may be configured to have the form of a cuboid capable of covering the antenna 100 and the waveguide 200 in upward, downward, lateral and rearward directions of the antenna 100, other than the main lobe direction of the antenna 100, and of covering the antenna 100 and the waveguide 200 in the back lobe direction.

The shield case 300 according to an embodiment may be positioned in a housing 400, and may have therein a shielding space which is concave toward the antenna 100. The shield case 300 may be made of at least one of copper, an alloy of copper and nickel, and aluminum.

The antenna 100 may include the circuit board 120 on which a circuit is formed, and the semiconductor 110, which is mounted on the circuit board 120 so as to emit and receive electromagnetic waves.

The antenna 100 may be composed of the circuit board 120, on which the semiconductor 110, adapted to emit and receive electromagnetic waves, is mounted. The semiconductor 110 may emit an electromagnetic wave and receive the electromagnetic wave as an electrical signal, and may transmit the electrical signal through the circuit board 120. The circuit board 120 may be composed of a PCB such that the electromagnetic wave, as an electrical signal emitted from or received by the semiconductor 110, is input to the circuit board 120.

The vehicular radar sensor may further include the housing 400, in which connector pins 410 electrically connected to the antenna 100 are provided and in which the shield case 300 having the antenna 100 and the waveguide 200 mounted thereon is mounted.

In order to protect the shield case 300, in which the antenna 100 and the waveguide 200 are mounted, from external impacts or the adverse influence of weather such as wind and rain, the vehicular radar sensor may include the housing 400 capable of accommodating therein the shield case 300.

The housing 400 may be provided with the connector pins 410, which are connected to the circuit board 120 of the antenna 100 to receive electrical signals, so as to transmit the electrical signal of a detected target to the controller of a vehicle.

The vehicular radar sensor may further include a radome 500, which covers the front open surface of the housing 400 and blocks interference with electromagnetic waves emitted from or received by the antenna 100.

The radome 500 may protect the shield case 300 having the antenna 100 and the waveguide 200 mounted thereon from external impact or adverse effect caused by weather such as wind and rain, in conjunction with the housing 400. Furthermore, the radome 500 may prevent interference with electromagnetic waves emitted forwards from the antenna 100 such that the electromagnetic waves precisely detect a target through the radome 500.

The waveguide 200 may be configured to have a rectangular cross-section. The flaring portion 210 may be inclined upwards or downwards at a first predetermined angle, and may be inclined rightwards or leftwards at a second predetermined angle. Here, the first predetermined angle may be greater than the second predetermined angle.

The waveguide 200 may be configured to have a rectangular cross-section, and the flaring portion 210 may be configured to have the shape of a rectangular column, which is inclined outwards, so as to guide the electromagnetic waves transmitted therethrough. The flaring portion 210 may be configured such that the upper and lower walls thereof are symmetrically inclined outwards at the same angle with respect to the restriction portion and the right and left walls thereof are symmetrically inclined outwards at the same angle with respect to the restriction portion. Since the upper and lower walls are inclined at the first predetermined angle and the right and left walls are inclined at the second predetermined angle, there is an effect of guiding electromagnetic waves transmitted through the waveguide 200.

In order to set the optimal horizontal or vertical field of view, the first predetermined angle may be set to be 26.5 degrees, and the second predetermined angle may be set to be 22 degrees.

The depth L1 of the restriction portion may be equal to one wavelength of the electromagnetic wave generated by the antenna 100.

The intermediate frequency of the radar sensor may be 79 GHz (77-81 GHz), and the wavelength of the electromagnetic wave may be about 3.8 mm. Considering this, the depth of the restriction portion may be set to be 3.8 mm, which is equal to one wavelength of the electromagnetic wave, so as to guide emission of the electromagnetic wave while firstly restricting the expansion of the electromagnetic wave emitted from the antenna 100.

The depth L2 of the flaring portion 210 may be set to be two times the wavelength of the electromagnetic wave emitted from the antenna 100.

The flaring portion 210 may be designed to be inclined outwards with respect to the restriction portion so as to precisely detect a target in the horizontal or vertical field of view of the electromagnetic wave emitted from the antenna 100. Here, the depth of the flaring portion 210 may be set to be 7.6 mm, which is two times the wavelength of the electromagnetic wave signal, so as to precisely guide the electromagnetic wave in the horizontal or vertical field of view of the electromagnetic wave.

The waveguide 200 may have formed therein a groove 250, which is formed in the rear end of one wall of the restriction portion so as to have a height higher than the height of the semiconductor 110.

Referring to FIG. 8, using a conventional radar sensor, it is difficult to precisely detect an object deviating from the center of the field of view. In order to solve this problem, the vehicular radar sensor according to the present invention may be constructed such that one side wall of the restriction portion is formed so as to be spaced apart from the circuit board 120 of the antenna 100 in the state in which the waveguide 200 is coupled to the antenna 100 and such that the spaced side wall of the restriction portion is formed with the groove 250 having a depth greater than the thickness of the semiconductor 110 of the antenna 100, thereby creating a side lobe. Accordingly, by virtue of the created side lobe, there is an effect of being capable of detecting an object deviating from the center of the field of view of the radar sensor.

The groove 250 may be formed in the lower wall of the waveguide 200 so as to create a side lobe, which is positioned under the main lobe of the electromagnetic wave emitted from or received by the antenna 100.

The vehicular radar sensor according to the present invention must be constructed so as to separately detect both a detection target such as an object and a human body, which is positioned in the horizontal or vertical field of view, and an object to avoid, such as a speed bump or curb, which is positioned under the detection object, when being mounted on a vehicle.

In order to separately detect both the detection target and the object to avoid, the groove 250 may be formed in the lower wall of the restriction portion so as to create a side lobe in the vertical field of view of the radar sensor, thereby detecting a speed bump or a curb positioned under the detection target and transmitting the detection signal to the controller of the vehicle.

The waveguide 200 may further include connectors 230, which extend rearwards from the restriction portion and are fitted into the circuit board 120, whereby the waveguide 200 is integrally coupled to the antenna 100.

In order to couple the waveguide 200 to the antenna 100, the connectors 230 may extend rearwards from the restriction portion of the waveguide 200, and holes may be formed through the circuit board 120. As a result, the connectors 230 may be fitted into the holes in the circuit board 120, thereby coupling the waveguide 200 to the antenna 100. Accordingly, it is possible to easily perform coupling and detachment of the waveguide 200 with respect to the antenna 100, and it is very convenient to perform maintenance and repair of the circuit board 120 and the semiconductor 110.

The waveguide 200 may further include a partition wall 240, which partitions the internal space of the waveguide 200 into two spaces.

In order to enable emission and reception of electromagnetic waves through a single antenna 100 to which the waveguide 200 is coupled, the waveguide 200 may be provided therein with the partition wall 240, which partitions the internal space of the waveguide 200 into a space for emission of electromagnetic waves and a space for reception of electromagnetic waves. As a result, one of the two spaces defined by the partition wall 240 may serve as an emission part, and the other may serve as a reception part.

The partition wall 240 of the waveguide 200 may have a thickness of 1 mm. By virtue of the partition wall 240, the waveguide 200 may have increased rigidity.

The partition wall 240 may extend vertically from the inner surface of the waveguide 200 to partition the antenna 100 into the emission part and the reception part.

When the semiconductor 110 of the antenna 100 is partitioned into the emission part and the reception part, the internal space of the waveguide 200 must also be partitioned into a right part and a left part. Therefore, the partition wall 240 of the waveguide 200 may be formed vertically such that the internal space of the waveguide 200 is partitioned into the emission part and the reception part for the electromagnetic waves emitted from or received by the antenna 100, thereby offering an effect of performing emission and reception of electromagnetic waves through a single antenna 100.

The partition wall 240 may be formed on the inner surface of the waveguide 200 in front of the semiconductor 110 or the groove 250.

The partition wall 240 may be formed in front of the groove 250 so as to create a side lobe. Furthermore, the partition wall 240 may be positioned in front of the semiconductor 110 without contacting the semiconductor 110 so as to prevent damage to the semiconductor 110.

As is apparent from the above description, according to the present invention, since the waveguide having the partition wall therein is mounted on the antenna, there is an effect of being capable of performing emission and reception of electromagnetic waves through a single antenna.

Furthermore, since the waveguide, which is mounted on the antenna, is composed of the restriction portion having a constant cross-sectional area, and the flaring portion, which is positioned in front of the restriction portion and extends obliquely outwards, there is an effect of being capable of precisely detecting a detection target.

In addition, since the groove is formed in the lower wall of the waveguide so as to create a side lobe in the vertical field of view of the radar sensor, there is an effect of being capable of detecting a speed bump, a curb and the like positioned under the detection target.

Although embodiments of the present invention have been described above with reference to the accompanying drawings, those skilled in the art will appreciate that the present invention can be implemented in various other embodiments without changing the technical ideas or features thereof.

What is claimed is:

1. A vehicular radar sensor comprising:
   an antenna including an emission part for emitting an electromagnetic wave and a reception part for receiving an electromagnetic wave;
   a waveguide including a restriction portion, which is open at front and rear surfaces thereof so as to allow an electromagnetic wave to be transmitted therethrough and which is fixed at the open rear surface thereof to the antenna and extends outwards from a front end of the antenna, and a flaring portion, which extends outwards with an increasing cross-sectional area from a front end of the restriction portion; and
   a shield case, which is open at a front surface thereof and which covers a circuit board and the waveguide mounted therein,
   wherein the shield case has a form of a cuboid and a shield space which is concave toward the antenna.

2. The vehicular radar sensor according to claim 1, further comprising a housing, which includes a connector pin electrically connected to the antenna and accommodates therein the shield case having the antenna and the waveguide mounted therein.

3. The vehicular radar sensor according to claim 2, wherein the housing is open at a front surface thereof, and
   wherein the vehicular radar sensor further comprises a radome, which covers the front open surface of the housing and prevents interference with an electromagnetic wave emitted from or received by the antenna.

4. The vehicular radar sensor according to claim 1, wherein the waveguide has a rectangular cross-section, and
   wherein the flaring portion is inclined upwards and downwards at a first predetermined angle and is inclined rightwards and leftwards at a second predetermined angle, the first predetermined angle being greater than the second predetermined angle.

5. The vehicular radar sensor according to claim 1, wherein the restriction portion has a depth equal to one wavelength of the electromagnetic wave emitted from the antenna.

6. The vehicular radar sensor according to claim 1, wherein the flaring portion has a depth that is two times a wavelength of the electromagnetic wave emitted from the antenna.

7. The vehicular radar sensor according to claim 1, wherein the antenna includes a circuit board, on which a circuit is formed, and a semiconductor mounted on the circuit board so as to project in a forward direction of the circuit board, the semiconductor being adapted to emit and receive the electromagnetic wave.

8. The vehicular radar sensor according to claim 7, wherein the waveguide has a groove formed in a rear end thereof, the groove being formed through one wall of the restriction portion and having a depth greater than a thickness of the semiconductor.

9. The vehicular radar sensor according to claim 8, wherein the groove is formed in a lower wall of the waveguide so as to create a side lobe, which is positioned under a main lobe of the electromagnetic wave emitted from and received by the antenna.

10. The vehicular radar sensor according to claim 1, wherein the waveguide includes a connector, which extends rearwards from the restriction portion and which is fitted onto the circuit board so as to integrally couple the waveguide to the antenna.

11. The vehicular radar sensor according to claim 1, wherein the waveguide includes a partition wall, which partitions an internal space of the waveguide into two spaces.

12. The vehicular radar sensor according to claim 11, wherein the partition wall extends vertically from an inner surface of the waveguide to divide the antenna into an emission part and a reception part.

13. The vehicular radar sensor according to claim 11, wherein
   the antenna includes a circuit board, on which a circuit is formed, and a semiconductor mounted on the circuit board so as to project in a forward direction of the circuit board, the semiconductor being adapted to emit and receive the electromagnetic wave,
   wherein the waveguide has a groove formed in a rear end thereof, the groove being formed through a side wall of the restriction portion and having a depth greater than a thickness of the semiconductor, and
   wherein the partition wall is formed on an inner surface of the waveguide in front of the semiconductor or the groove.

14. The vehicular radar sensor according to claim 1, wherein the antenna comprises a directional antenna.

15. The vehicular radar sensor according to claim 1, wherein the shield case is formed from at least one of copper, a copper and nickel alloy, and aluminum.

16. A vehicular radar sensor comprising:
   an antenna including an emission part for emitting an electromagnetic wave and a reception part for receiving an electromagnetic wave;
   a waveguide including a first portion which allows an electromagnetic wave to be transmitted therethrough and which is fixed at one surface thereof to the antenna and extends outwards from a front end of the antenna, and a second portion which extends outwards with an increasing cross-sectional area from the first portion; and
   a shield case, which is open at a front surface thereof and covers a circuit board and the waveguide mounted therein,
   wherein the shield case has a form of a cuboid and a shield space which is concave toward the antenna.

17. The vehicular radar sensor according to claim 16, wherein the first portion of the waveguide extends outwards from the antenna with a constant cross-sectional area, and wherein the second portion of the waveguide extends outwards from the first portion of the waveguide with an increasing cross-sectional area.

* * * * *